Feb. 25, 1936.   J. J. GALLIGAN ET AL   2,031,703
CRINKLED ELASTIC MATERIAL
Filed Sept. 1, 1932
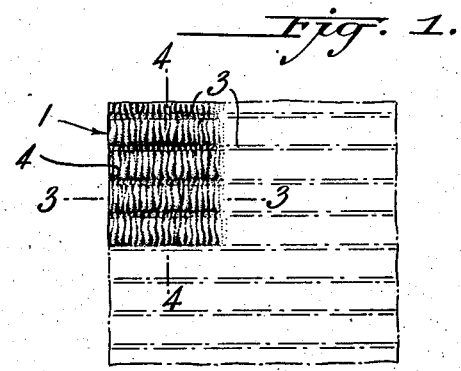
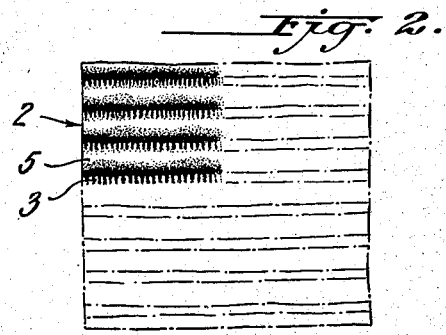
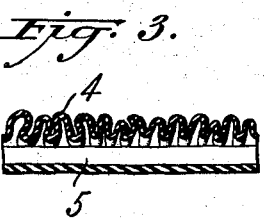
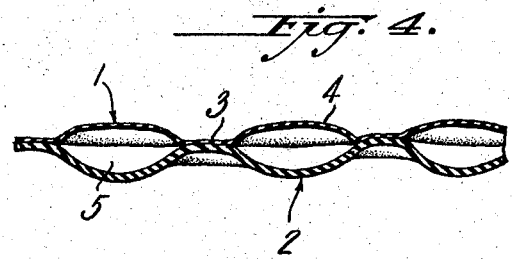
INVENTORS
JAMES J. GALLIGAN
WILLIAM J. ROBINSON
BY
ATTORNEY Patented Feb. 25, 1936

2,031,703

UNITED STATES PATENT OFFICE 2,031,703

CRINKLED ELASTIC MATERIAL

James J. Galligan and William James Robinson, Providence, R. I., assignors, by mesne assignments, to United States Rubber Company, New York, N. Y., a corporation of New Jersey Application September 1, 1932, Serial No. 631,313

13 Claims. (Cl. 154—55)

This invention relates to a crinkled elastic material, more particularly to a rubber material which is outwardly crinkled on both sides.

In the rubber industry, in the manufacture of various articles from sheet material, particularly such as bathing caps, belts, bags, etc., one of the great essentials in the trade, in addition to desired utilitarian properties, is a highly ornamental and novel appearance. Such properties and appearance can be obtained by crinkling or puckering sheet rubber in various designs.

An object of our invention is to provide a crinkled rubber or similar material which is outwardly puckered on both sides.

Another object is to provide an improved crinkled rubber which is light for its bulk and very flexible, resilient and elastic.

Another object is to provide a crinkled rubber or similar material in which the crinkling or puckering may be of a different design on opposite sides.

Other objects will appear from a consideration of the detailed description, claims, and drawing, in which latter:

Figure 1 is an enlarged top view of one form of the material;

Fig. 2 is a similarly enlarged view of the bottom of the material;

Fig. 3 is an enlarged section on the line 3—3 of Fig. 1; and

Fig. 4 is an enlarged section on the line 4—4 of Fig. 1.

In one manner of making the article, a sheet of unvulcanized rubber is fed, under tension sufficient to appreciably stretch it longitudinally, between a smooth roll and a cooperating even speed roll provided with projecting ridges or other forms of projections. Simultaneously with the longitudinal stretching of the sheet there is a certain amount of transverse contraction. Coincidentally with the feeding of the stretched sheet, there is fed in between the rolls a second sheet of unvulcanized rubber in an unstretched condition. Due to the pressure between the projections on the one roll and the smooth roll, the unstretched sheet of raw rubber is adhesively united to the stretched sheet at the points where pressure is exerted. As the two sheets emerge from between the bite of the rolls, the tension on the stretched sheet is released, thereby causing it to contract in length and expand in width more or less, and this contraction causes those portions of the unstretched sheet which have not been attached by pressure to pucker up or crinkle, while apparently the lateral expansion of the stretched sheet after it is released causes it to buckle up and pucker, crinkle, wrinkle, fold or corrugate if its resistance and tensile strength are not too great. It should be understood that while in the preparation of crude rubber by the milling operation, preliminary to calendering it while warm into sheets, its elasticity has been temporarily destroyed to a considerable extent in order to render it plastic enough for calendering, at the same time the calendered sheet when it has cooled recovers sufficient elasticity to enable it to be stretched to some extent and to then contract when the tension is released. It will, of course, be understood that when carrying out the above process, the tension on the unvulcanized stretched sheet will not be sufficient to rupture or unduly extend it.

As a result of the above steps, the composite sheet thus produced is not only crinkled outwardly on the side where the unstretched sheet was disposed, but it may be also crinkled outwardly on the opposite side. If the projections on the one roll are in the form of circumferential spaced ridges, the opposite sides of the composite crinkled sheet will appear with spaced, more or less broken and crinkled narrow areas or lines at the points where the pressure exerted by the ridges has united the sheets. In the case of the unstretched sheet, there will appear longitudinal rows of short, more or less irregular puckers which in general extend transversely between the spaced lines, while in the case of the stretched sheet there will appear substantially continuous longitudinal puckers, wrinkles, folds or corrugations between the spaced lines.

In the figures of the drawing there is illustrated on a much enlarged scale one form of crinkled material made according to the invention, and in which the material was passed between a smooth roll and a cooperating even speed roll provided with evenly spaced circumferential ridges. The numeral 1 designates generally the sheet at one side of the material, and the numeral 2 the sheet on the opposite side. At 3 are indicated the lines or narrow areas along which the two sheets have been adhesively united by the pressure between the ridged and plain rolls. These lines or joined areas are not continuous, but more or less broken. In the material illustrated the sheet 2 is the one which was under tension and in contact with the ridged roll, while the sheet 1 was not under tension during passage through the rolls. The sheet 1 appears with longitudinally extending rows of short, more or less irregular, transverse puckers 4 between the joint lines 3, while directly below the rows of transverse puckers, and between the lines 3, the lower sheet has continuous longitudinal puckers 5, each longitudinal pucker, wrinkle, fold or corrugation being disposed directly below a row of small transverse puckers.

The crinkled sheet thus produced may then be vulcanized to permanently set it, if a sheet material is desired, and the vulcanized material may afterwards be made up into articles or used in its sheet form. On the other hand, the unvulcanized sheet may be cut up and directly assembled into various articles such as bathing caps, bathing shoes, aprons, etc., and the finished articles then vulcanized. There is an advantage in so making up articles from the unvulcanized crinkled material, because the scrap produced by cutting can be reused by merely remilling with fresh stock and calendering, and there is a further advantage that in assembling articles from the cut pieces of the unvulcanized crinkled material, a better adhesion may be had in the making process.

Any suitable form of machine capable of carrying out the crinkling step may be used, for instance, that disclosed in our copending application Serial No. 614,172, filed May 28, 1932. This machine comprises essentially two cooperating even speed rolls, one of which is plain and the other ridged.

In feeding the sheets between the pressure rolls, the tensioned or stretched sheet may be disposed either in contact with the smooth roll or in contact with the roll having the projections, but the latter method of feeding is preferred. It is also preferred to use for the sheet which is under tension, a somewhat heavier gauge stock than the unstretched sheet.

Instead of using only two sheets, more may be used, and in this case an interior sheet will be the one to be placed under tension.

Also, it is not essential in carrying out the method that all of the sheets be entirely unvulcanized, and instead, one or more or all of the sheets may be lightly vulcanized, provided that the vulcanization is not carried to a point sufficient to seriously affect the adhesiveness of the stocks. If a sheet be vulcanized to a substantial extent, its ability to adhere is too greatly reduced for the making of a permanent connection, and at the same time its elasticity is increased to a point where it will tend to remain flat and not pucker when joined to a raw or less vulcanized sheet. If an unvulcanized sheet be used with one which is lightly vulcanized, then the lightly vulcanized sheet is the one which is to be placed under tension when uniting the two, and if two or more lightly vulcanized sheets are to be united, the one which is to be placed under tension should be vulcanized to a greater degree than the remaining sheets.

It is obvious that the gauge of the stocks to be used may be varied to suit conditions and according to the pattern desired, but for some purposes, as in carrying out the example first given, it has been found that a gauge of .0045 inch is suitable for the unstretched sheet, and a gauge of .008 inch for the stretched sheet. The crinkled design produced may be widely varied by varying any or all of the following conditions: pressure between the rolls, gauge of stock, character of the rubber stock, use of unvulcanized rubber and/or rubber of varying degrees of light vulcanization, number of plies, tension, variation in the shape, effective pressure area and spacing of the roll projections, and by uniting the sheets with the tensioned sheet in contact with either the smooth roll or the roll having the projections.

A suitable method of vulcanizing the crinkled stock is by the vapor cure using sulphur chloride. This method has the advantage of simplicity, cheap equipment, and it does not cause dulling or dimming of bright colored stocks. Moreover, it permits the ready use of varying degrees of light cure in those cases where a partially vulcanized stock is to be employed in making the crinkled rubber. However, any other suitable method of vulcanization may be employed, particularly those utilizing modern high powered low-temperature accelerators of vulcanization. There may also be employed the diffusion method of vulcanization disclosed in patent to Cadwell, No. 1,777,960, dated October 7, 1930, by which method the rubber stocks may be compounded with a portion of the vulcanizing ingredients and the balance of the vulcanizing combination introduced by diffusion from the surface, or the stock for one ply may be compounded with a portion of the vulcanizing ingredients, and the stock of the remaining ply or plies compounded with the complementary vulcanizing ingredients required to complete the combination. It will be understood that in the case where the sulphur monochloride cure is used, it is unnecessary to include any vulcanizing ingredients in the rubber stock, since vulcanization is accomplished entirely by diffusion of the sulphur chloride into the rubber stock.

Where the term "vulcanizable" is applied to a rubber stock in this specification, it is intended to comprehend a stock having no vulcanizing ingredients therein, or an unvulcanized stock which contains vulcanizing ingredients, or a stock which has been lightly vulcanized and which is capable of still further vulcanization before assuming the condition which in the rubber art would be considered as substantially or fully vulcanized for the finished article.

In place of rubber, it is obvious that any rubber substitute or synthetic rubber having the desired properties may be used, and the term "rubber", as broadly used, is intended to comprehend such materials.

By plying up a desired number of sheets of the crinkled material, there may be obtained a relatively thick material of great lightness and high resiliency, similar in general properties to sponge rubber, and such material is capable of wide use as a shock or sound deadener or for insulating purposes.

By the invention there is produced a crinkled or puckered article of high utility and ornamental appearance which is crinkled on both sides. The material is very light for its bulk, and it is very flexible, elastic and resilient. By using different colored sheet stocks, a contrasting color appearance, as well as a contrasting design, may be obtained on opposite sides of the finished material. The material is applicable to a wide number of uses, such as bathing caps, bathing suits, bathing shoes, belts, bags, armlets, and beach wear generally. It is also capable of use for aprons, baby pants, footwear, doilies, table covers, pillow covers, wash cloths, and, due to the large entrapped air space, it is also capable of wide use as a sound, vibration and heat insulator.

While a specific modification of the invention has been shown and described, it is obvious that it is capable of wide variations and it is not desired to limit it otherwise than is required by the prior art and as set forth in the appended claims.

Having thus described our invention, what we claim and desire to protect by Letters Patent is:

1. As a new article, integrally united plies of elastic material having air pockets therebetween, the ply on each outer side of the composite article being outwardly puckered, the rubber of one ply of the article having a greater resistance to stretch than the remainder.

2. As a new article, plies of rubber integrally united along spaced small areas, one outer ply having series of small puckers, and the other outer ply being also puckered, the rubber of one ply of the article having a greater resistance to stretch than the remainder.

3. As a new article, integrally united plies of rubber, one outer ply having slightly spaced rows of small puckers, and the other outer ply having substantially continuous longitudinal puckers, the rubber of one ply of the article having a greater resistance to stretch than the remainder.

4. As a new article, plies of rubber integrally united along spaced parallel lines, one outer ply having slightly spaced rows of closely set puckers, and the other outer ply having substantially continuous longitudinal puckers aligned with said rows of puckers, the rubber of one ply of the article having a greater resistance to stretch than the remainder.

5. As a new article, plies of rubber integrally united along spaced areas, the unjoined portions of the plies on each side of the article being puckered, and one ply being of heavier gauge than the remainder.

6. An a new article, plies of rubber integrally united along spaced lines, the ply on one outer side of the article having rows of puckers, and the ply on the other outer side of the article having substantially continuous longitudinal puckers, said last ply being of heavier gauge than the first ply.

7. As a new article, plies of rubber integrally united along parallel spaced lines, the ply on one outer side of the article having rows of transverse puckers between said lines, and the ply on the other outer side of the article having substantially continuous longitudinal puckers aligned with said rows of transverse puckers, said last ply being of heavier gauge than the first ply.

8. As a new article, an inner ply of rubber, and an outer ply of rubber on each side thereof, said plies being united at a multiplicity of points over their areas, and said outer plies being formed with outwardly directed projections over their areas at points intermediate the points of union.

9. As a new article, an inner ply of rubber, and an outer ply of rubber on each side thereof, said outer plies having a vulcanized union with the inner ply at a multiplicity of points over their areas, and said outer plies having a multiplicity of outwardly directed puckers or crinkles disposed intermediate said points of union.

10. As a new article, plies of rubber adhesively united at closely spaced narrow areas over substantially their entire surfaces, the intermediate disconnected or free portions of at least one ply being formed into relatively small, closely spaced, raised portions, and the rubber of one ply having a greater resistance to stretch than the remainder.

11. As a new article, plies of rubber adhesively united at small, closely spaced areas over substantially their entire surfaces, the intermediate disconnected or free portions of at least one ply being formed with relatively small, closely spaced, irregular projections having air pockets therewithin, the rubber of one ply of the article having a greater resistance to stretch than the remainder.

12. As a new article, plies of rubber adhesively united at small, closely spaced areas over substantially their entire surfaces, the intermediate free portions of at least one ply being formed with relatively small, closely spaced projections having air pockets therewithin, the rubber of one ply being of heavier gauge than the remainder.

13. As a new article, superposed plies of rubber adhesively united at small closely spaced areas over substantially their entire extent, free portions of the ply on one surface being formed with relatively small, closely spaced hollow projections, the opposite surface of the material being formed with indentations at the united areas, and the rubber of said opposite surface being of heavier gauge than said first named ply.

JAMES J. GALLIGAN.
WILLIAM J. ROBINSON.